United States Patent Office 3,455,910
Patented July 15, 1969

3,455,910
UNSATURATED LACTONES OF THE STEROID SERIES AND PROCESS FOR THEIR MANUFACTURE
Werner Fritsch, Neuenhain, Taunus, Ulrich Stache and Werner Haede, Hofheim, Taunus, and Kurt Radscheit, Kelkheim, Taunus, Germany, assignors to Farbwerke Hoechst Aktiengesellschaft vormals Meister Lucius & Bruning, Frankfurt am Main, Germany, a corporation of Germany
No Drawing. Filed Feb. 17, 1967, Ser. No. 616,796
Claims priority, application Germany, Mar. 10, 1966, F 48,627
Int. Cl. C07c *167/00, 173/00, 173/02*
U.S. Cl. 260—239.57           5 Claims

ABSTRACT OF THE DISCLOSURE $\Delta^{\alpha,\beta}$-$\beta$-($\Delta^{4,14}$-androstadiene - 3 - one - 17 - yl) - butenolide convertible to cardioactive canarigenin. Process for preparing unsaturated steroid lactones by first reacting an alkali metal salt of a malonic acid semi-ester with a 21- (or 15,21-) sulfonic acid ester or a 21- (or 15,21)-chloro derivative of a 3,20-dioxo-21-hydroxy-5$\beta$-pregnane or -$\Delta^4$- pregnene, and then treating the resulting compound with a tertiary organic base.

---

The present invetnion relates to unsaturated lactones of the steroid series and to a process for their manufacture which comprises reacting 21-hydrohalic or sulfonic acid esters of 3,20-dioxo-21-hydroxy-5$\beta$-pregnanes or -$\Delta^4$- pregnenes which may contain in 15-position a further sulfonic acid ester group or a halogen atom, with alkali metal salts of malonic acid semi-esters and treating the compounds obtained with tertiary organic bases, if desired or necessary, in the presence of their salts.

The process of the present invention can be carried out, for example according to the following reaction scheme:

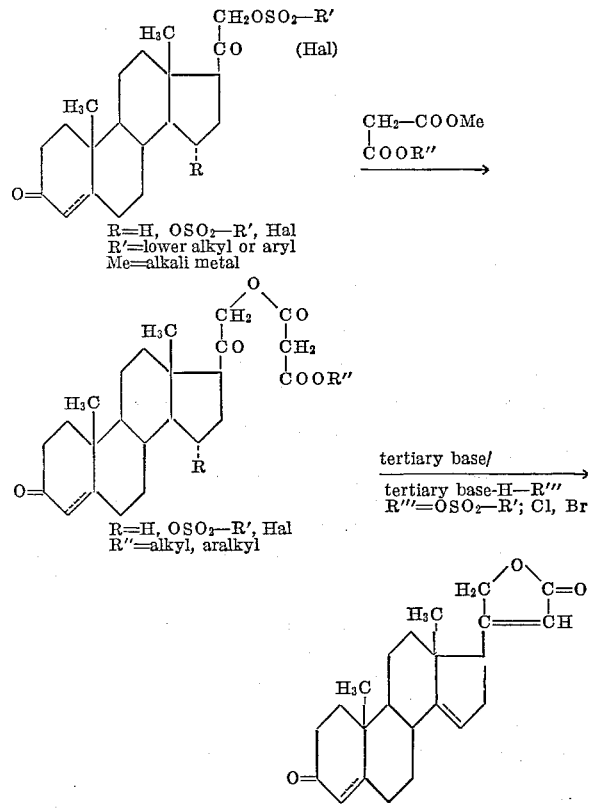

The steroid molecule may contain, in other positions, substituents which are inert towards the reagents, for example alkyl or alkoxy groups or also double bonds, for example in the $\Delta^1$ and/or $\Delta^{9,11}$-positions.

The hitherto unknown 21-esters of the 3,20-dioxo-pregnane or $\Delta^4$-pregnene derivatives used as starting substances are obtained, for example, by reacting the corresponding 21-hydroxy compounds with sulfo-chlorides, such for example as, methane-, benzene-, or toluene-sulfo-chloride in the presence of tertiary bases preferably pyridine, if desired or required, in the presence of an inert organic solvent such, for example, as acetone.

During prepaartion of the sulfonic acid esters as starting substances at elevated temperatures, the corresponding 21-chloro derivatives can be formed by an exchange reaction, for example between the 21-sulfonates formed and pyridine hydrochloride, which derivatives during the further course of the reaction can be reacted in the same manner as the 21-sulfonates. Hence, there may also be used as starting substances the 21-halides which correspond to the sulfonic acid esters (which can be prepared, for example, according to the method described by Fieser and Fieser in "Steroide," German Edition, Verlag Chemie, Heidelberg (1961), pp. 682–683 and 740–741).

The crude 21-sulfonic acid esters or 15,21-disulfonic acid esters obtained or the corresponding 21-halides are advantageously reacted, without further purification, with alkali metal salts of malonic acid or semi-esters in solvents which are suitable for this purpose, for example, acetone, a mixture of acetone, water and acetic acid, advantageously in dimethyl formamide.

The reaction time is from about 5 minutes to 5 hours. The reaction temperatures are in the range between 50° C. and the boiling temperature of the solvent used. Surprisingly, the 15$\alpha$-sulfonic ester group or the halogen group is not affected thereby. As malonic acid semi-esters, semi-esters with lower aliphatic or araliphatic alcohols such, for example, as ethanol, methanol or benzyl alcohol, are mainly used. As alkali metal salts especially sodium and potassium salts are used.

The 21-carbalkoxy- or 21-carbalkoxy-acetoxy steroids thus obtained, which may contain an ester group in 15-position, are treated according to the process of the present invention with tertiary organic amines. This reaction is carried out at temperatures between room temperature and about 90° C. In general, the reaction is completed when the formation of carbon dioxide has ceased. The reaction time amounts to 10 minutes up to several (3–6) hours depending on the quantity of the mixture. As tertiary organic amines, there may advantageously be used high-boiling bases such, for example, as collidine or quinoline, but it is also possible to operate in pyridine or aliphatic tertiary amines, such for example, as triethylamine, tripropylamine or tributylamine.

If steroid derivatives which do not have a substituent in the 15-position are used as starting materials, it is suitable to add a salt of the tertiary amine used to the amine. As acid addition salts, there may be used, for example, salts from organic sulfonic acids such for example, as methanesulfonic acid, p-toluene-sulfonic acid or from inorganic acids, particularly, from hydrohalic acids such, for example, as hydrochloric acid or hydrobromic acid. If, however, steroid derivatives are used which carry a further ester group in 15-position, the addition of the amine salt is not absolutely necessary, since corresponding salts are formed intermediately from the ester group in 15-position and the amine used. In many cases, however, the yield is increased by the addition of the amine salt.

For working up, dilute mineral acids, for example, hydrochloric acid, are added to the cooled reaction mixture until it shows an acid reaction, whereupon in most cases the butenolide formed precipitates in crystalline form. It is often advantageous to remove a large part of the amine by distillation under reduced pressure before adding the hydrochloric acid.

In compariosn with the hitherto known processes, the process of the present invention saves several reaction steps. The process is especially advantageous for the synthesis of $\Delta^{14}$-butenolides which are valuable intermediate products for the manufacture of cardenolides which have a favourable action on the heart. In one single reaction stage, the butenolide ring is closed, decarboxylated to form the unsubstituted butenolide and the double bond is introduced into the 14,15-position of the steroid molecule. The products of the process are valuable intermediate products for the preparation of pharmaceutically active steroid derivatives.

The following examples serve to illustrate the invention but they are not intended to limit it thereto.

EXAMPLE 1

$\Delta^{\alpha,\beta}$-$\beta$-($\Delta^{4,14}$-androstadiene-3-one-17-yl)-butenolide For preparing the starting substance, 5.25 g. of $\Delta^4$-pregnene-15$\alpha$,21-diol-3,20-dione are suspended in a mixture of 60 ml. of acetone and 18 ml. of pyridine, combined at 0° C. with 9 ml. of methane-sulfonic acid chloride and stirred for 5 hours at this temperature under an atmosphere of nitrogen. After addition of 110 ml. of water, the whole is shaken with a mixture of methylene chloride and ether. The extract is washed with dilute hydrochloride acid, water, dilute sodium hydrogen carbonate solution and water until neutrality, dried with sodium sulfate and finally concentrated to dryness under reduced pressure.

The crude $\Delta^4$-pregnene-15$\alpha$,21-diol-3,20-dione - 15,21-dimesylate obtained is added, without further purification, to 50 ml. of dimethylformamide and 12.4 g. of the potassium salt of malonic acid benzyl-semi-ester and the whole is stirred for 2½ hours in a bath at 60° C., then cooled and poured into about 150 ml. of water. The whole is extracted twice by shaking with methylene chloride. The combined extracts are washed several times with water, dried over sodium sulfate and concentrated to dryness at 45° C. under reduced pressure.

The crude $\Delta^4$-pregnene-15$\alpha$,21 - diol - 3,20-dione-15-mesylate-21-carbobenzoxy-acetate thus obtained is, without further purification, heated with 70 ml. of collidine for 2¼ hours to the boiling temperature under reflux and while stirring, under an atmosphere of nitrogen. The major part of the collidine is removed by evaporation under reduced pressure. The reaction mixture is combined with dilute hydrochloric acid and extracted with methylene chloride. After washing with dilute hydrochloric acid and water and drying over sodium sulfate, the organic phase is concentrated to dryness under reduced pressure. After recrystalliaztion of the residue from a mixture of methylene chloride and methanol, 1.46 g. of $\Delta^{\alpha,\beta}$-$\beta$-($\Delta^{4,14}$-androstadiene-3-one-17-yl)-butenolide melting at 275°–278° C. (uncorrected) are obtained.

EXAMPLE 2

$\Delta^{\alpha,\beta}$-$\beta$-($\Delta^{4,14}$-androstadiene-3-one-17-yl)-butenolide Crude $\Delta^4$-pregnene-15$\alpha$,21 - diol-3,20-dione - 15,21-dimesylate, prepared by the reaction of 4.25 g. of $\Delta^4$-pregnene-15$\alpha$,21-diol-3,20-dione in 48 ml. of acetone and 14.5 ml. of pyridine with 7.3 ml. of methane-sulfonic acid chloride, as described in Example 1, is combined without further purification with 40 ml. of dimethylformamide and 5.6 of the potassium salt of malonic acid mono-ethyl ester and the whole is stirred for 3 hours under an atmosphere of nitrogen at a bath temperature of 60° C. Then, the whole is cooled and poured into about 200 ml. of water and extracted with a mixture of methylene chloride and ether. The organic phase is washed 6 times with a sufficient quantity of water, dried over sodium sulfate and finally evaporated to dryness under reduced pressure.

The crude $\Delta^4$-pregnene-15$\alpha$,21 - diol - 3,20 - dione - 15- mesylate - 21 - carboethoxy-acetate obtained is combined without further purification with 41 ml. of collidine and heated for about 3–5 minutes on the steam bath until all is dissolved. Subsequently, the solution is cooled to room temperature and allowed to stand for 1 hour. After addition of 8 drops of water and 12 g. of p-toluene-sulfonic acid, the solution is heated for 3–5 minutes on the steam bath, whereupon almost all dissolves. The whole is then heated for 50 minutes to boiling, under reflux cooling at a bath temperature of 205° C. and under an atmosphere of nitrogen. The evolution of carbon dioxide ceases after about 30 to 35 minutes. The reaction mixture is strongly concentrated under reduced pressure. It is then combined with dilute hydrochloric acid and extracted with methylene chloride. The organic phase is washed with dilute hydrochloric acid and with water, dried over sodium sulfate and concentrated to dryness under reduced pressure. After recrystallization of the residue from a mixture of methylene chloride and methanol, 2.38 g. of $\Delta^{\alpha,\beta}$-$\beta$-($\Delta^{4,14}$-androstadiene-3-one-17-yl) butenolide, melting at 275°–278° C. (uncorrected) are obtained.

EXAMPLE 3

$\Delta^{\alpha,\beta}$-$\beta$-($\Delta^4$-androstene-3-one-17-yl)-butenolide 17.2 ml. of methane-sulfonic acid chloride are added at 0° C. to a suspension of 10 g. of desoxycorticosterone in a mixture of 113 ml. of acetone and 25 ml. of pyridine, and the whole is stirred for 5 hours at this temperature. The reaction mixture is then combined with 200 ml. of water and extracted three times by shaking with a mixture of methylene chloride and ether. The organic phase is washed with dilute hydrochloric acid, water, a dilute sodium hydrogen carbonate solution and water neutrality, dried over sodium sulfate and concentrated to dryness under reduced pressure.

The crude desoxycorticosterone-21-mesylate thus obtained is directly reacted, without further purification, in the following manner:

The crude product is combined with 100 ml. of dimethylformamide and 14 g. of the potassium salt of the malonic acid monoethyl ester and the whole is stirred for 2½ hours under an atmosphere of nitrogen, at a bath temperature of 60° C. The cooled reaction mixture is then combined with 600 ml. of water and extracted by shaking with a mixture of methylene chloride and ether. The extract is washed 6 times with water, dried with sodium sulfate and evaporated to dryness under reduced pressure. The crude $\Delta^4$ - pregnene - 21 - ol - 3,20 - dione - 21 - carbethoxy-acetate obtained dissolves after addition of 96 ml. of collidine and after heating for 6 minutes on the steam bath. After 15 minutes of standing at room temperature, the whole is heated again for a short time on the steam bath and the hot solution is combined with 27 g. of p-toluene-sulfonic acid. The whole is then heated under reflux for 40 minutes to the boiling temperatures at a bath temperature of 205° C. and under an atmosphere of nitrogen and while stirring. The evolution of carbon dioxide ceases after about 35 minutes. The reaction mixture is then concentrated and combined with dilute hydrochloric acid until the total quantity of collidine is completely linked. The crystals which have precipitated are filtered off, washed with water and, after drying under reduced pressure at 40° C., recrystallized from a mixture of methylene chloride and acetone. 5.88 g. of $\Delta^{\alpha,\beta}$-$\beta$-($\Delta^4$-androstene - 3 - one - 17 - yl) - butenolide melting at 242°–244° C. (Kofler-block) are obtained.

EXAMPLE 4

$\Delta^{\alpha,\beta}$-$\beta$-($\Delta^{14}$-5$\beta$-androstene-3-one-17-yl)-butenolide For preparing 5$\beta$ - pregnane - 15$\alpha$,21 - diol - 3,20 - dione-15,21-dimesylate to be used as the starting substance, 13.9 g. of crude 5$\beta$-pregnane-15$\alpha$,21-diol-3,20-dione (obtained from 13.86 g. of $\Delta^4$-pregnane-15$\alpha$,21-diol-3,20-dione by catalytic hydrogenation in the presence of a palladium/zinc carbonate catalyst) are suspended in a mixture of 158 ml. of acetone and 48 ml. of pyridine. After introducing 24 ml. of methane-sulfochloride at 0° C. with stirring, the whole is stirred for 8 hours at this temperature under an atmosphere of nitrogen. After addition of 280 ml. of water, the mixture is extracted by shaking with a mixture of methylene chloride and ether. The extract is washed with dilute hydrochloric acid, water, a dilute sodium hydrogen-carbonate solution and water until neutrality, dried with sodium sulfate and finally concentrated to dryness under reduced pressure. The crude $5\beta$ - pregnane - $15\alpha,21$ - diol - $3,20$ - dione-15,21-dimesylate thus obtained is combined without further purification with 135 ml. of dimethylformamide and 18.5 g. of the potassium salt of the malonic acid mono-ethyl ester, and the whole is heated for 10 minutes at 22° C., then for 10 minutes at 25° C., then for 10 minutes at 30° C., for 60 minutes at 35° C., for 20 minutes at 45 C., for 20 minutes at 50 C., 20 minutes at 55° C. and, finally, for 3 hours to 57°–59° C., while continuously stirring under an atmosphere of nitrogen. The whole is cooled and introduced while stirring into 1 liter of water. The whole is then shaken out twice with methylene chloride. The extracts are washed several times with a large quantity of water, dried over sodium sulfate and concentrated to dryness at 45° C. under reduced pressure.

The crude $5\beta$ - pregnane - $15\alpha,21$ - diol - $3,20$ - dione-15-mesylate-21-carbethoxy-acetate thus obtained is combined without further purification with 132 ml. of collidine and heated for about 3–5 minutes on the steam bath until all is dissolved. The solution is cooled to room temperature and allowed to stand for 1 hour. After addition of 8.6 g. of p-toluene-sulfonic acid and 1.1 ml. of water, the reaction solution is heated again on the steam bath, with rotation of the reaction vessel. After standing for 15 minutes at room temperature, the whole is finally combined with 29 g. of p-toluene-sulfonic acid and heated for 1 hour and 40 minutes to boiling under reflux and under a stream of nitrogen and at a bath temperature of 210° C. After about 1½ hours, the evolution of carbonic acid ceases. The reaction mixture is strongly concentrated under reduced pressure. It is then combined while cooling with dilute hydrochloric acid, and water, dried over sodium sulfate and concentrated to dryness under reduced pressure.

After recrystallization of the residue from a mixture of methylene chloride and methanol, 6.28 g. of $\Delta^{\alpha,\beta}$-$\beta$-($\Delta^{14}$-5$\beta$-androstene-3-on-17-yl)-butenolide melting at 256°–259° C. are obtained.

We claim:
1. $\Delta^{\alpha,\beta}$-$\beta$-($\Delta^{4,14}$-androstadiene-3-one-17-yl)-butenolide.
2. A process for the manufacture of unsaturated lactones of the steroid series, which comprises reacting at least one member selected from the group consisting of the 21-sulfonic acid ester and the 21-chloro derivative of a 3,20 - dioxo - 21 - hydroxy - $5\beta$ - pregnane or -$\Delta^4$-pregnene with an alkali metal salt of a malonic acid semi-ester, and then reacting the compound so formed with a tertiary organic base.
3. A process as in claim 2 wherein a salt of said tertiary organic base is present together with said base.
4. A process as in claim 2 wherein said pregnane or pregnene has a further sulfonic acid ester group or chloro group in the 15-position.
5. A process as in claim 4 wherein a salt of said tertiary organic base is present together with said base.

References Cited
UNITED STATES PATENTS

| | | | |
|---|---|---|---|
| 2,417,017 | 3/1947 | Ruzicka | 260—239.5 |
| 2,932,641 | 4/1960 | Ruschig et al. | 260—239.57 |

OTHER REFERENCES
Polonia et al., Helv. Chim. Acta 42 5, August 3, 1959, pp. 1437–47, p. 1438 relied upon.

ELBERT L. ROBERTS, Primary Examiner

U.S. Cl. X.R.

260—397.1, 397.47, 999